(12) United States Patent
Koefelda et al.

(10) Patent No.: US 6,811,125 B1
(45) Date of Patent: Nov. 2, 2004

(54) SHIPPING POD

(75) Inventors: Gerald R. Koefelda, Seal Beach, CA (US); Donald L. Bell, Redondo Beach, CA (US)

(73) Assignee: Rehrig Pacific Company, Los Angeles, CA (US)

(*) Notice: Subject to any disclaimer, the term of this patent is extended or adjusted under 35 U.S.C. 154(b) by 153 days.

(21) Appl. No.: 09/688,780

(22) Filed: Oct. 16, 2000

(51) Int. Cl.[7] .............................................. F16M 11/22
(52) U.S. Cl. .............................. 248/188.8; 248/188.1; 248/677; 248/678; 108/53.1
(58) Field of Search .................................. 248/677, 678, 248/188, 188.8, 188.9, 188.91, 615

(56) References Cited

U.S. PATENT DOCUMENTS

| | | | | |
|---|---|---|---|---|
| 1,830,058 A | * | 11/1931 | Helmond | |
| 1,894,453 A | * | 1/1933 | Sutton | |
| 1,926,392 A | * | 9/1933 | Kritzer | 308/11 |
| 2,602,616 A | * | 7/1952 | Helmond | 248/24 |
| 2,610,010 A | * | 9/1952 | Dodge | 248/20 |
| 2,893,665 A | * | 7/1959 | Paulsen | 248/24 |
| 2,921,760 A | * | 1/1960 | Wheeler | 248/24 |
| 3,412,502 A | * | 11/1968 | Riches | 46/25 |
| 3,443,530 A | * | 5/1969 | Carlson | 108/56 |
| 4,051,787 A | * | 10/1977 | Nishitani et al. | 108/55.3 |
| 5,017,328 A | * | 5/1991 | Mazurek | 267/136 |
| 5,615,429 A | * | 4/1997 | Williams | 5/509.1 |
| 5,878,984 A | * | 3/1999 | Grieser et al. | 248/188.8 |
| 6,006,677 A | * | 12/1999 | Apps et al. | 108/57.25 |
| 6,199,487 B1 | * | 3/2001 | Coddington | 108/56.1 |
| 6,234,088 B1 | * | 5/2001 | Bredal et al. | 108/91 |

* cited by examiner

Primary Examiner—Leslie A. Braun
Assistant Examiner—Steven Marsh

(57) ABSTRACT

A stackable shipping pod adapted for use on a relatively large object having a bottom surface with a plurality of bores therein, each bore for receiving a threaded member, and further having an outside perimeter. The shipping pod includes a top wall which mates to the bottom surface of the large object and has an opening through which the threaded member is extended. Also included is a perimeter wall which extends downwardly and outwardly from the top wall, and has an exterior surface facing away from the top wall and an interior surface facing inward, such that the interior surface of the shipping pod nests proximate to the exterior surface of a second subjacent shipping pod when in a stacked orientation.

50 Claims, 14 Drawing Sheets

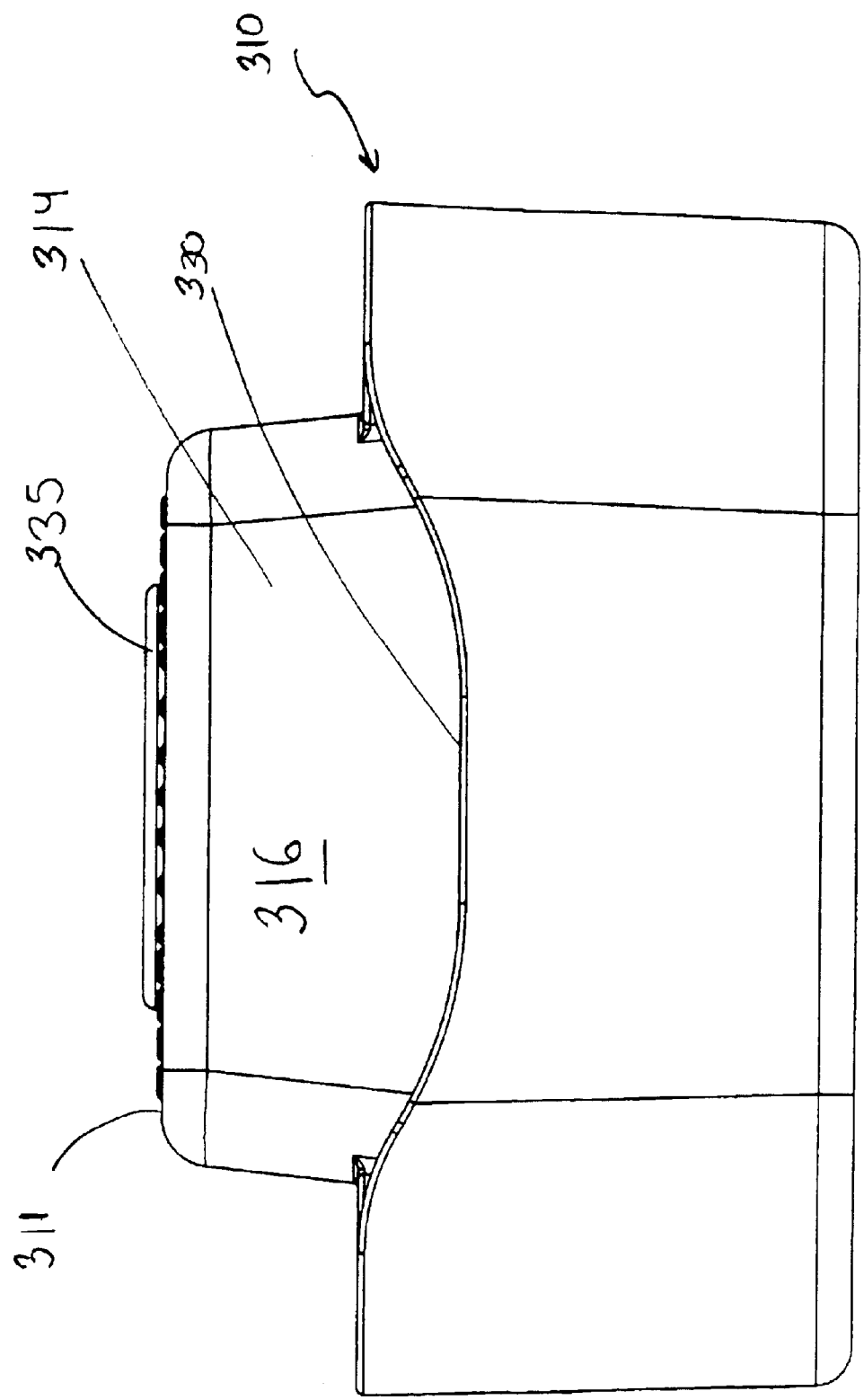

SHIPPING POD

TECHNICAL FIELD

The present invention relates to a shipping pod adapted for use on the bottom of vending machines and other relatively large objects.

BACKGROUND ART

It is often necessary to move or relocate vending machines or other large and heavy objects, whether it be from the manufacturer to the customer, or from the customer to a service facility. In particular, vending machines generally have four bolt holes for securing four leveling feet to the bottom of the machine with threaded fasteners such as bolts. The leveling feet typically do not provide for stable support when the machine is placed on an uneven floor or transport rack without time consuming readjustment of the feet. Also, many transport racks do not have a continuous floor surface to support the leveling feet. Therefore, to facilitate transporting and storing the vending machine, the vending machine is lifted and the bolts holding the leveling feet in place are removed.

A wooden plank (generally a 2"×6" board with a length approximately the width of the vending machine) is sometimes used to provide a more stable footing for vending machines. Each wooden plank typically has two holes on the wider surface for receiving two corresponding bolts that hold the leveling feet in place on one side of the vending machine. The wooden plank is positioned so that each of the plank boles is over the bolt holes in the vending machine. The bolts are then threaded into the machine through the holes in the wooden plank thereby securing the wooden plank in place. A second wooden plank is then attached in a similar fashion to the remaining two bolt holes in the bottom of the vending machine. The vending machine with wooden planks attached is then lifted and placed on a wheeled rack for transport.

A first draw back of the prior art is that the height of the wooden planks typically does not allow fork lift tines to get underneath the vending machine to lift it, and therefore an overhead crane must be used to place the vending machine on the wheeled racks. Therefore, wheeled racks must be used to move the vending machine around the repair factory. Even if the fork lift tines are able to get underneath the machine, the fork lift would only be able to lift the vending machine from two out of the four sides because of the continuous length of the wooden planks.

A second drawback of the prior art is that the wooden planks are bulky and take up valuable factory space when they are not being used.

A third drawback of the prior art is that the wood planks are not durable and splinter and fall apart from repeated use and/or over tightening of the bolts and are subject to warpage and damage from exposure to water and other environmental conditions.

A fourth drawback of the prior art is that the wooden planks are not recyclable or re-usable.

Consequently, there is a need for a device which permits ease of transporting a vending machine. It should be durable, able to withstand varied environmental conditions, lightweight, reusable, recyclable, and easy to store when not in use.

DISCLOSURE OF INVENTION

It is a principal object according to the present invention to provide a shipping pod for vending machines which allows a forklift to lift a vending machine from all four directions.

It is another object according to the present invention to provide a shipping pod for vending machines which is capable of stacking and nesting with a like shipping pod to provide more efficient storage.

It is yet another object to the present invention to provide a shipping pod for vending machines which is robust, rigid, and able to withstand repeated use and varied environmental conditions.

It is yet another object of this invention to provide a shipping pod which is re-usable, and inexpensive and easy to manufacture.

Accordingly, a nestable shipping pod is provided for use on large objects such as vending machines having a bottom surface with a plurality of openings or bores for receiving a threaded member and an outside perimeter. The shipping pod includes a top wall for mating to the bottom surface of the large object. The top wall has an opening through which the threaded member is extended for attaching the shipping pod to the bottom surface of the large object. A perimeter wall extends downwardly and outwardly from the top wall. The perimeter wall has an exterior surface facing away from the top wall and interior surface facing inward. When like shipping pods are stacked, the interior surface of the upper shipping pod nests proximate the exterior surface of the lower shipping pod. The shipping pod preferably has an outer perimeter wall extending upwardly and outwardly from the perimeter wall. Further, the shipping pod may have a bottom wall which connects the perimeter wall and the outer perimeter wall.

In another embodiment, the shipping pod is provided and is adapted for use on vending machines having a bottom surface with at least one aperture to receive corresponding threaded members and an outside perimeter. This embodiment include includes a top wall for mating to the bottom surface of the vending machine. The top wall has a opening for receiving the threaded member for attaching the shipping pod to the bottom surface of the vending machine. An inner perimeter wall which extends downwardly and outwardly from the top wall. The inner perimeter wall has a bottom edge, an exterior surface facing away from the top wall, and interior surface facing inward. An outer perimeter wall is spaced apart from the inner perimeter wall and is attached to the inner perimeter wall. The two walls define a pocket. This embodiment has a bottom wall for connecting the inner perimeter wall and outer perimeter wall.

In yet another embodiment of the present invention, a stackable shipping pod for use on relatively large objects having a bottom surface with a plurality of bores therein for receiving a threaded member and an outside perimeter is provided. The shipping pod includes a planar upper wall member for mating to the bottom surface of a vending machine. The upper wall member has an opening through which the threaded member is extended for attaching the shipping pod to the bottom of the vending machine. A sidewall member extends downwardly from the periphery of the upper wall member. The sidewall member and the upper wall member define a compartment. When in a stacked orientation, the compartment of the shipping pod receives the upper wall member of a second shipping pod.

The sidewall is preferably a double-wall construction having an inner wall member and an outer wall member. A bottom wall connects the inner wall member and the outer wall member, and provides a surface for resting upon a floor or other planar surface upon which the vending machine may be placed.

For each of the embodiments, the shipping pod also preferably includes a plurality of gussets between the inner wall member and the outer wall member to add rigidity and support to the shipping when it is under load. Each of the embodiments also preferably includes an anti-slip or anti-rotation portion cooperating with the top surface of the shipping pod, such as protrusions or a scuffed surface, to enhance contact to the bottom surface of the vending machine and prevent rotation. The shipping pod according to the present invention is preferably sized to extend the beyond the outside perimeter of the vending machine to prevent adjacent vending machines from bumping into each other during transportation or while in the factory. Still further, the top wall may further include an undersurface having ribs to deter bolt wear and to add strength and rigidity to the shipping pod. Additionally, the pod includes a handle, preferably contoured and formed on the outer perimeter wall to facilitate handling of the shipping pod.

In still another embodiment, the shipping pod includes a grommet in the opening to minimize the rotation of the shipping pod when installed on the large object or vending machine.

The above objects then other objects, features, and advantages of the present invention are readily apparent from the following detailed description of the best mode for carrying out the invention when taken in connection with the accompanying drawings wherein like reference numerals corresponds to like components.

BRIEF DESCRIPTION OF DRAWINGS

FIG. 14 is a side elevational view of a fourth embodiment of the shipping pod having a grommet disposed in the opening.

BEST MODE FOR CARRYING OUT THE INVENTION

Figure 1:
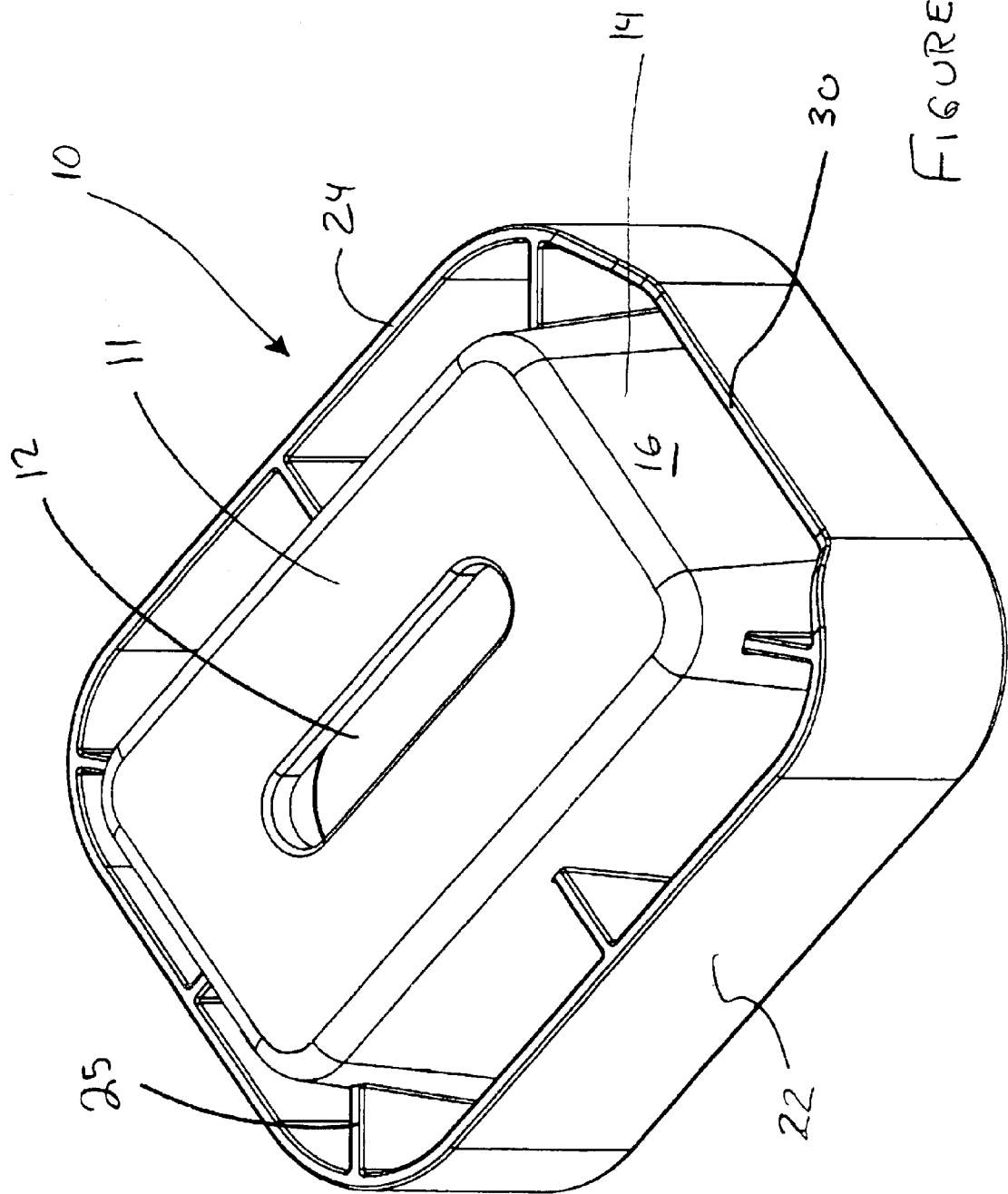
FIG. 1 is a top perspective view of a shipping pod according to the present invention.
Figure 2:
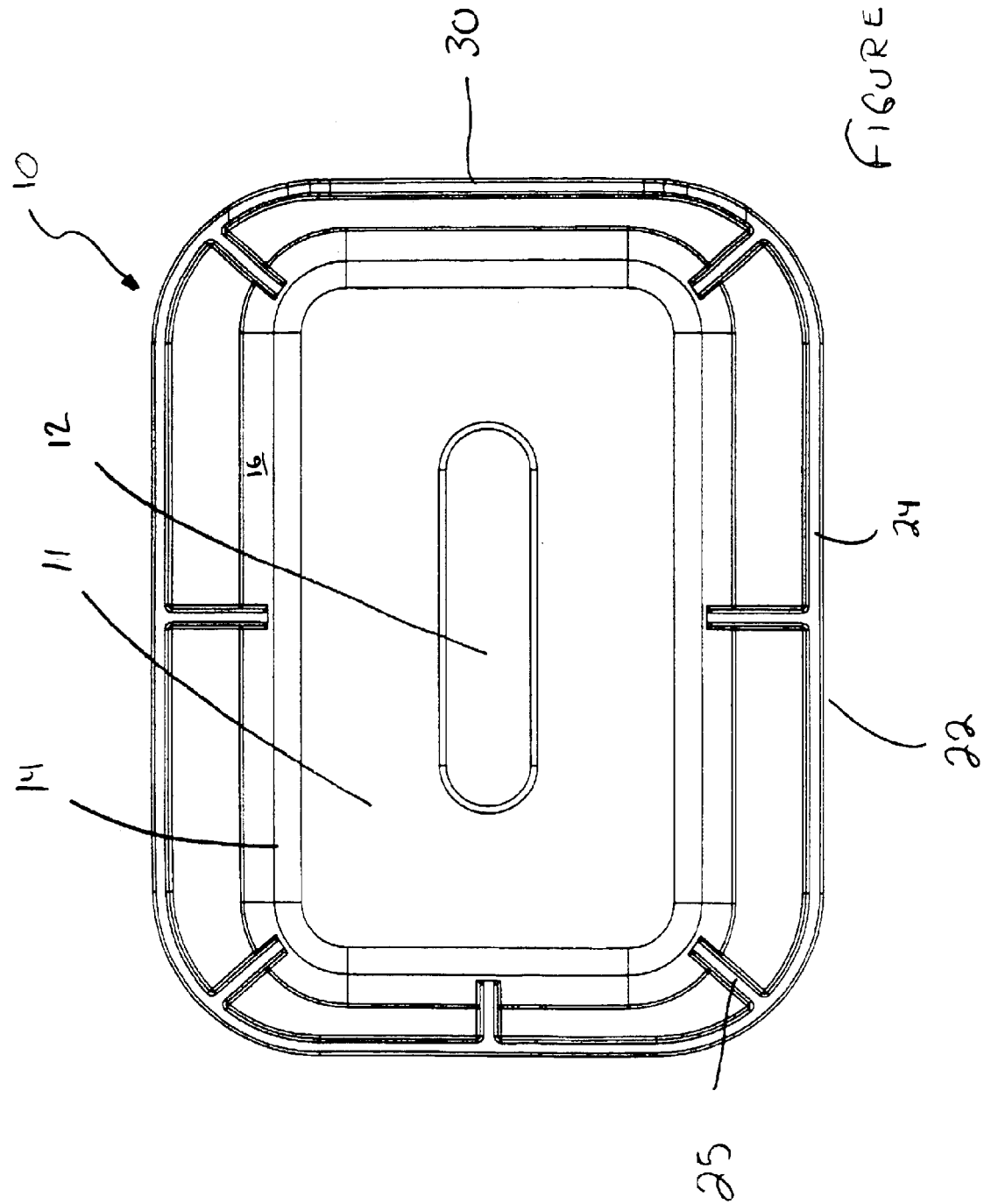
FIG. 2 is a top plan view of the shipping pod of FIG. 1.
Figure 9:
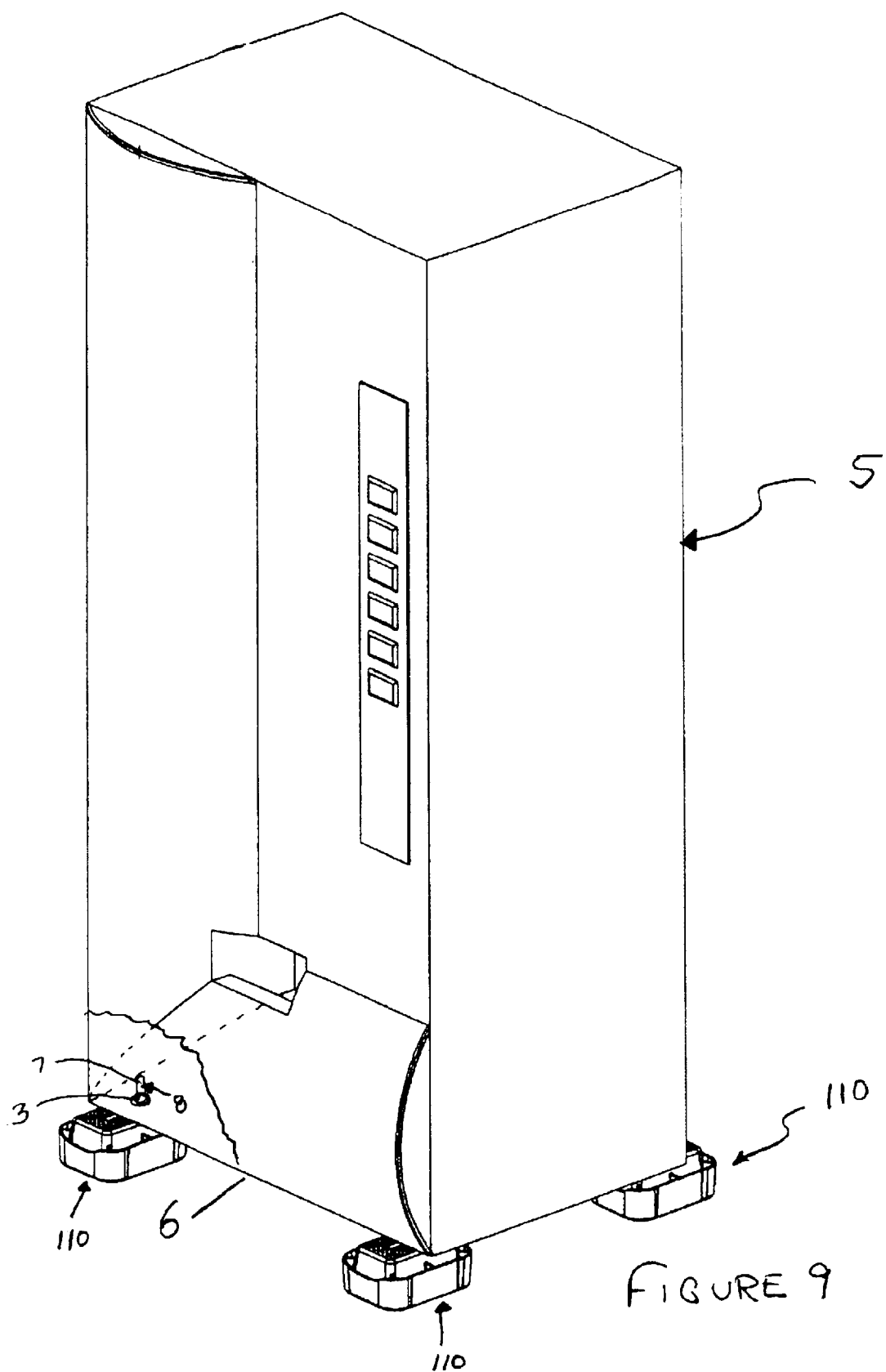
FIG. 9 is a perspective view of a vending machine with four shipping pods, similar to those in FIG. 5, attached thereto, the vending machine having a cutaway section showing the attachment of the pod to the vending machine.

With reference to FIGS. 1 and 2 of the drawings, a shipping pod 10 according to the present invention is illustrated therein. As shown in FIG. 9, the shipping pod 110 (similar to shipping pod 10) is adapted for use on a relatively large, bulky or heavy object, such as a vending machine 5, which has an outside perimeter 6 and a bottom surface with a plurality of bores or apertures 3 formed therein, preferably threaded (illustrated in the partial cut-away section of FIG. 9), previously used to receive corresponding threaded members and secure the wood leveling feet of the prior art (not shown). Generally, as heretofore described, vending machines in the prior art use wood leveling feet attached to the vending machine with bolts.

Shipping pod 10 disclosed herein is not limited to use on vending machines, but may be adapted to be used on any number of large objects according to the teachings of the present invention, for example, appliances such as clothes washing machines and dryers, automatic dishwashers, and the like. The shipping pod embodiments disclosed herein are preferably injection molded from a thermoplastic material, such as polyethylene, but may be alternatively formed out of other plastic materials, rubber materials, composite materials, and/or by different manufacturing processes without departing from the teachings according to the present invention.

Figure 5:
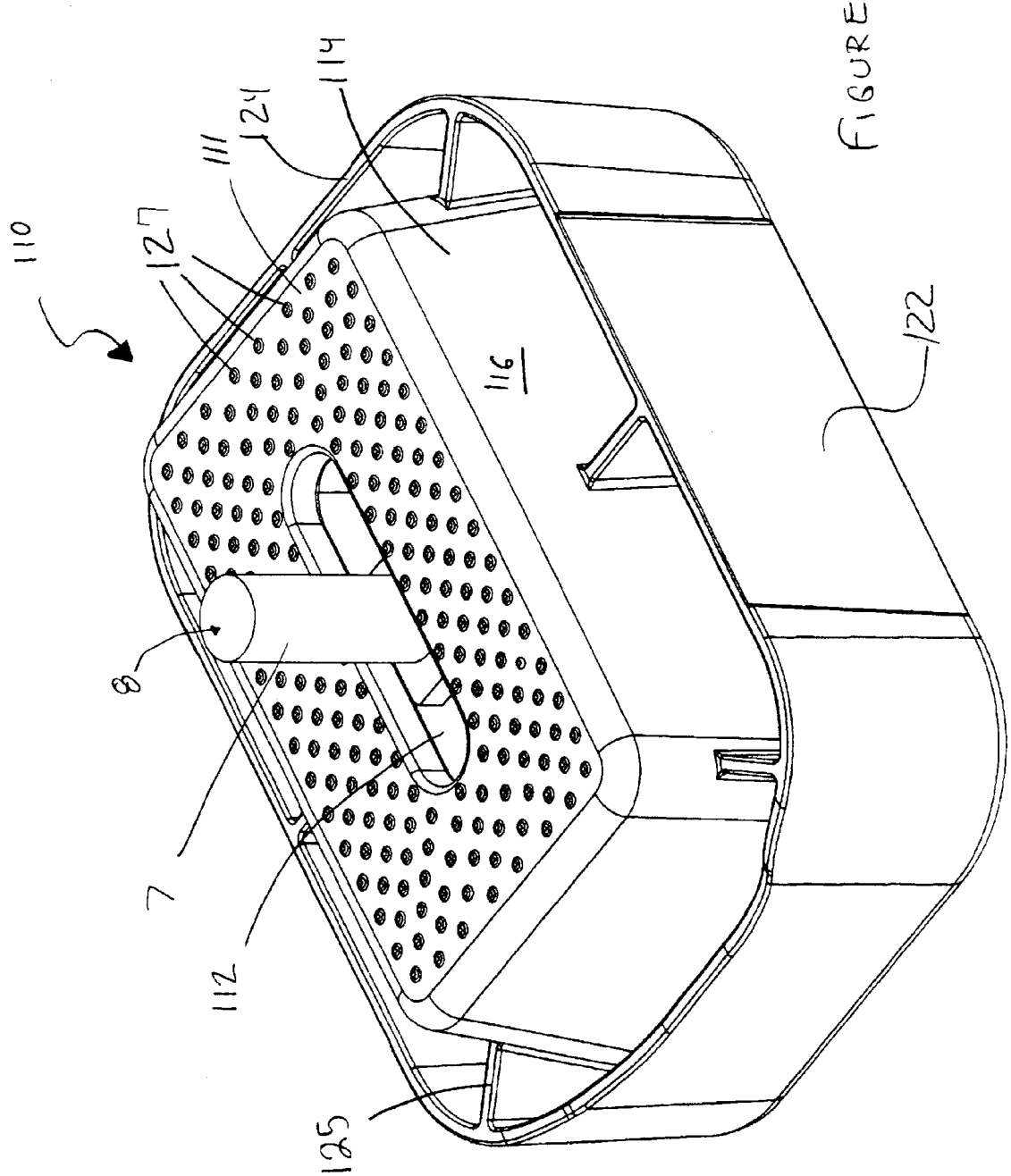
FIG. 5 is a top perspective view of a second embodiment of a shipping pod according to the present invention showing protrusions formed on the top wall and a bolt through the opening.
Figure 6:
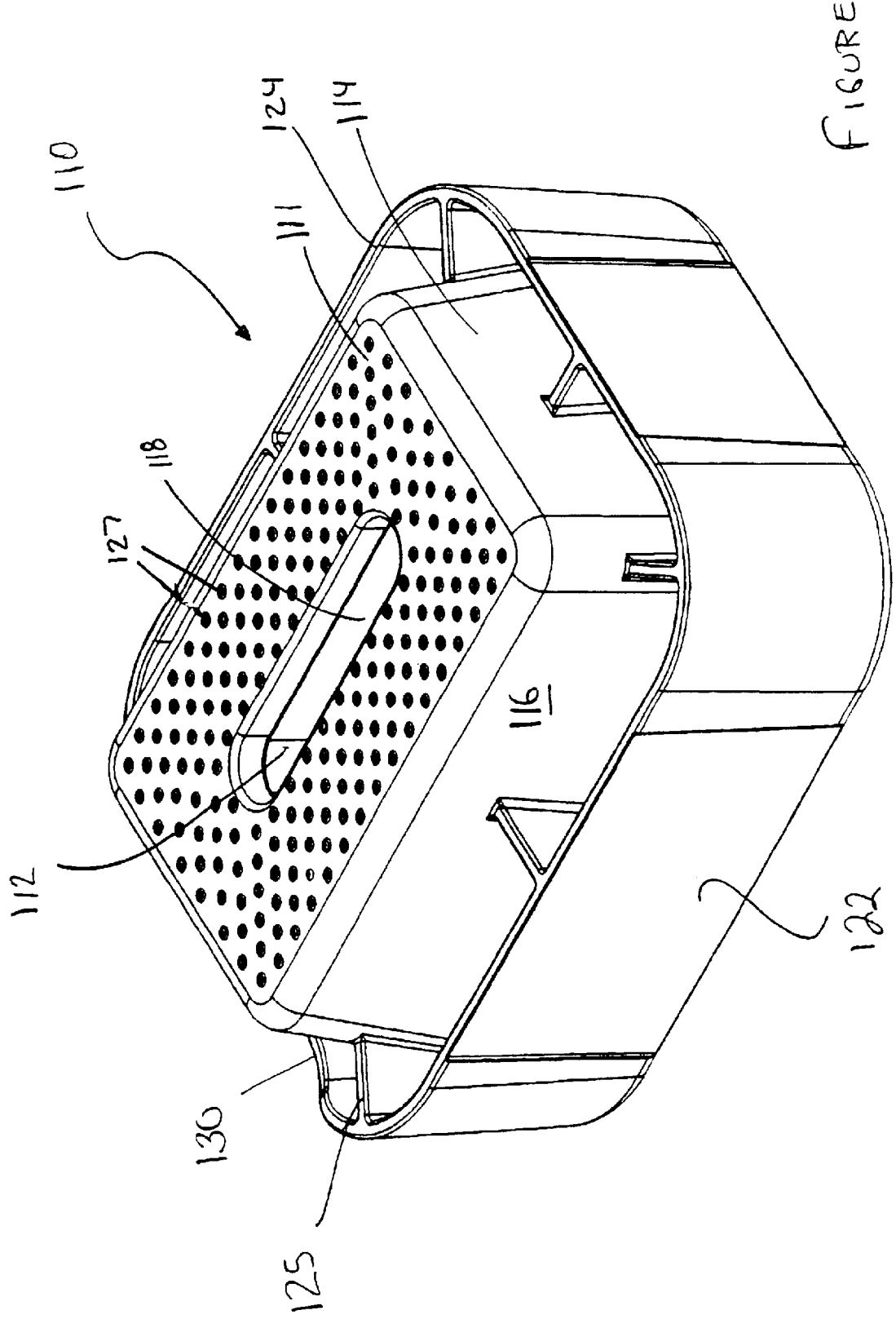
FIG. 6 is an alternate top perspective view of the second embodiment of the shipping pod.

Shipping pod 10 includes a top wall 11 with an opening 12 therein. Although opening 12 is shown as an elongated slot through top wall 11, it may be round, square or otherwise shaped. Also, depending on the use and application of the pod, and the deviation required by such use, it is further contemplated that opening 12 may be two or more separate openings, such as two or more individual holes, or may also be one or more half-slot portions. As shown in FIG. 5, opening 12 is sized to receive the shank 7 of fastener 8 such as a threaded bolt, in order to attach shipping pod 10 to vending machine 5, as shown in FIG. 9.

For additional strength and rigidity, shipping pod 10 may also include a plurality of gussets 25 between inner perimeter wall 14 and outer perimeter wall 22, as shown in FIG. 1. Further, a handle portion 30 may be provided on shipping pod 10 by reducing the height of upper edge 24 of outer perimeter wall 22 to make it easier for a user to pick up or otherwise handle the shipping pod 10. In this embodiment, it is noted that no gussets 25 are placed adjacent handle 30. Outer perimeter wall 22 may also be stamped or screened with a brand name, company or logo which is related to the manufacture, distributor or supplier of products contained in vending machine 5, the vending machine 5 itself, or the pod 10.

Figure 3:
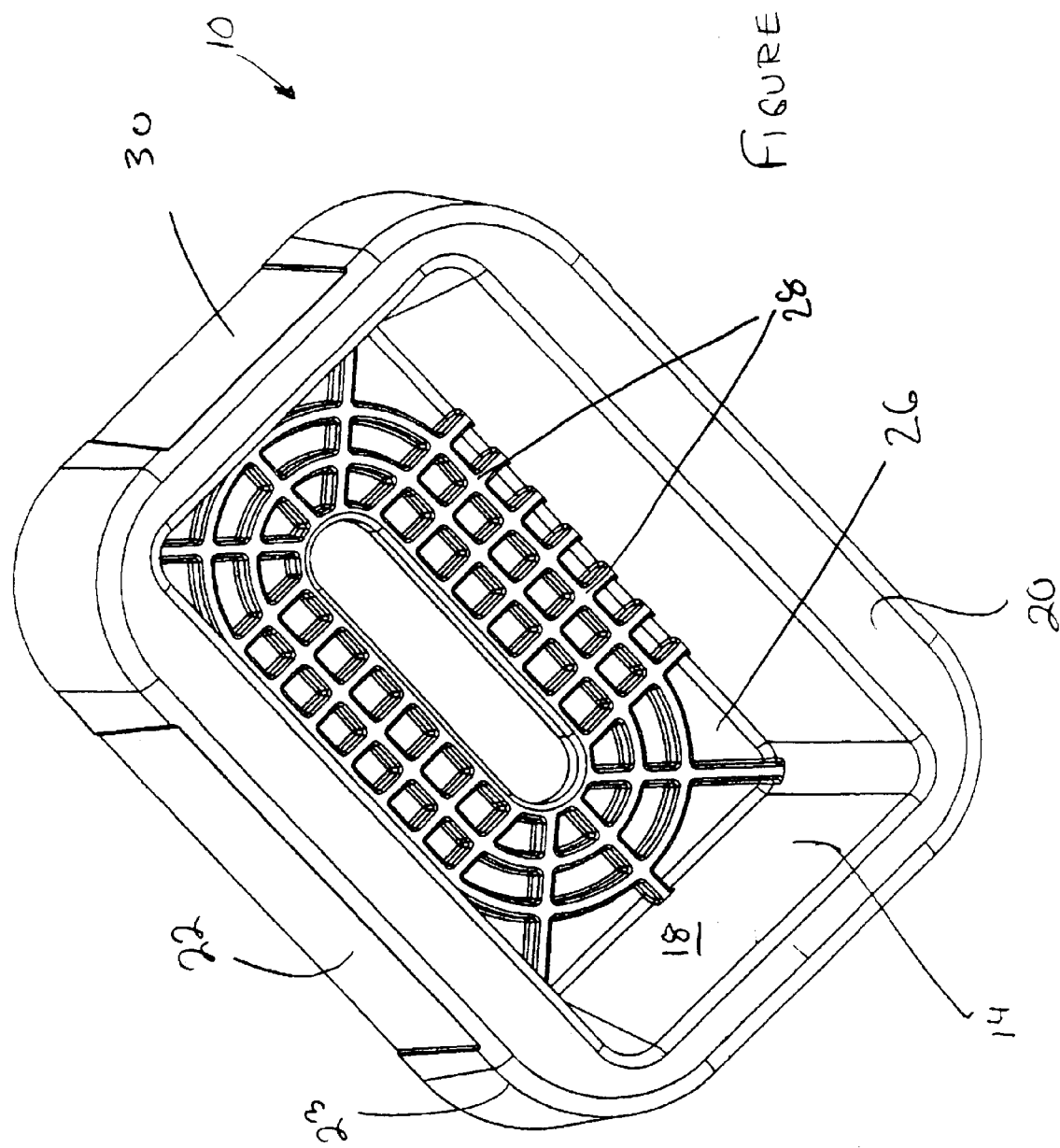
FIG. 3 is a bottom perspective view of the shipping pod of FIG. 1.
Figure 4:
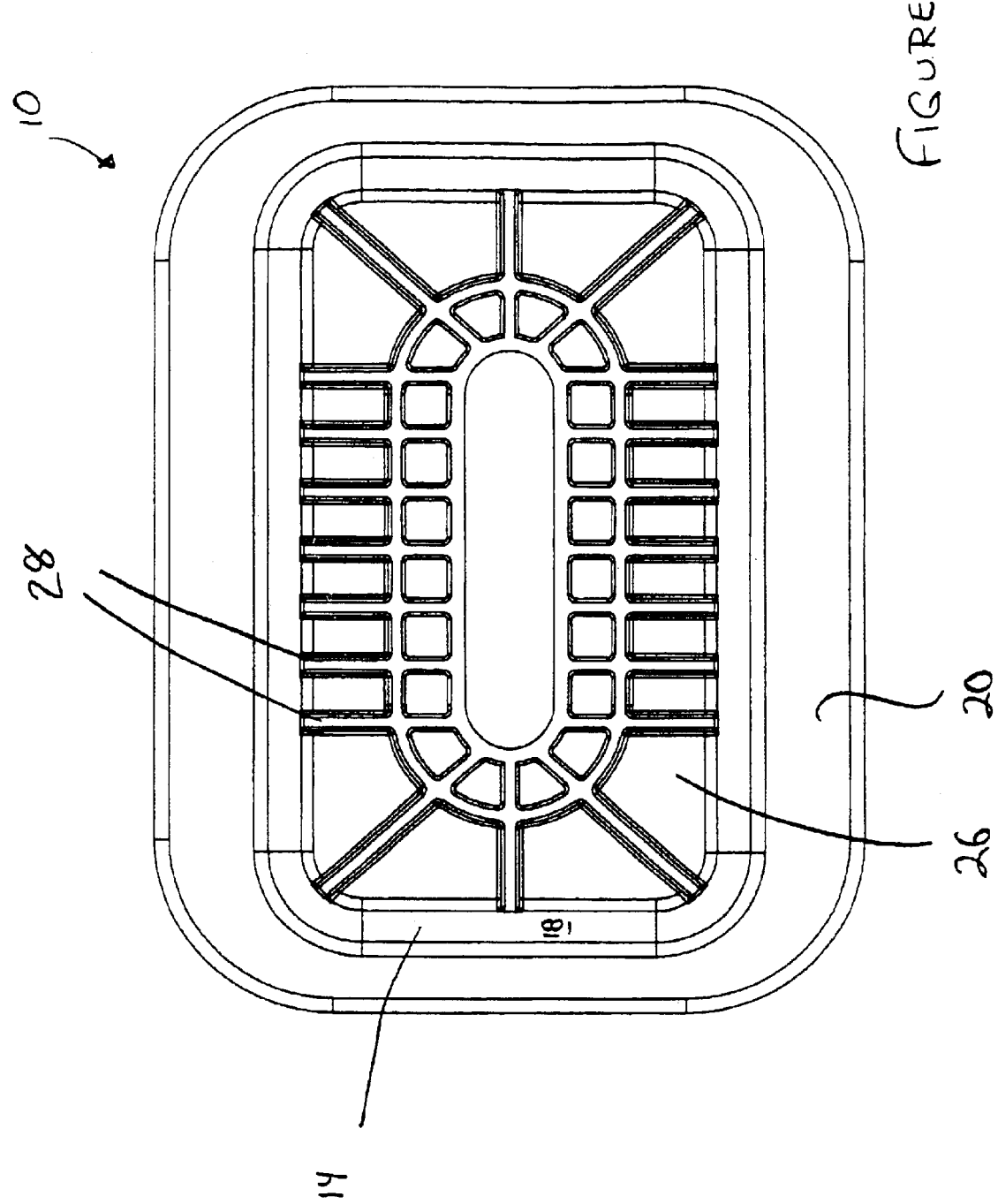
FIG. 4 is a bottom plan view of the shipping pod of FIG. 1.

Referring to the bottom perspective view of FIG. 3 and the bottom plan view of FIG. 4, top wall 11 may have an undersurface 26 which has a plurality of ribs 28 formed therein for added strength and rigidity and also to deter bolt wear when shipping pod 10 is attached to vending machine 5 (see FIG. 9.)

Figure 7:
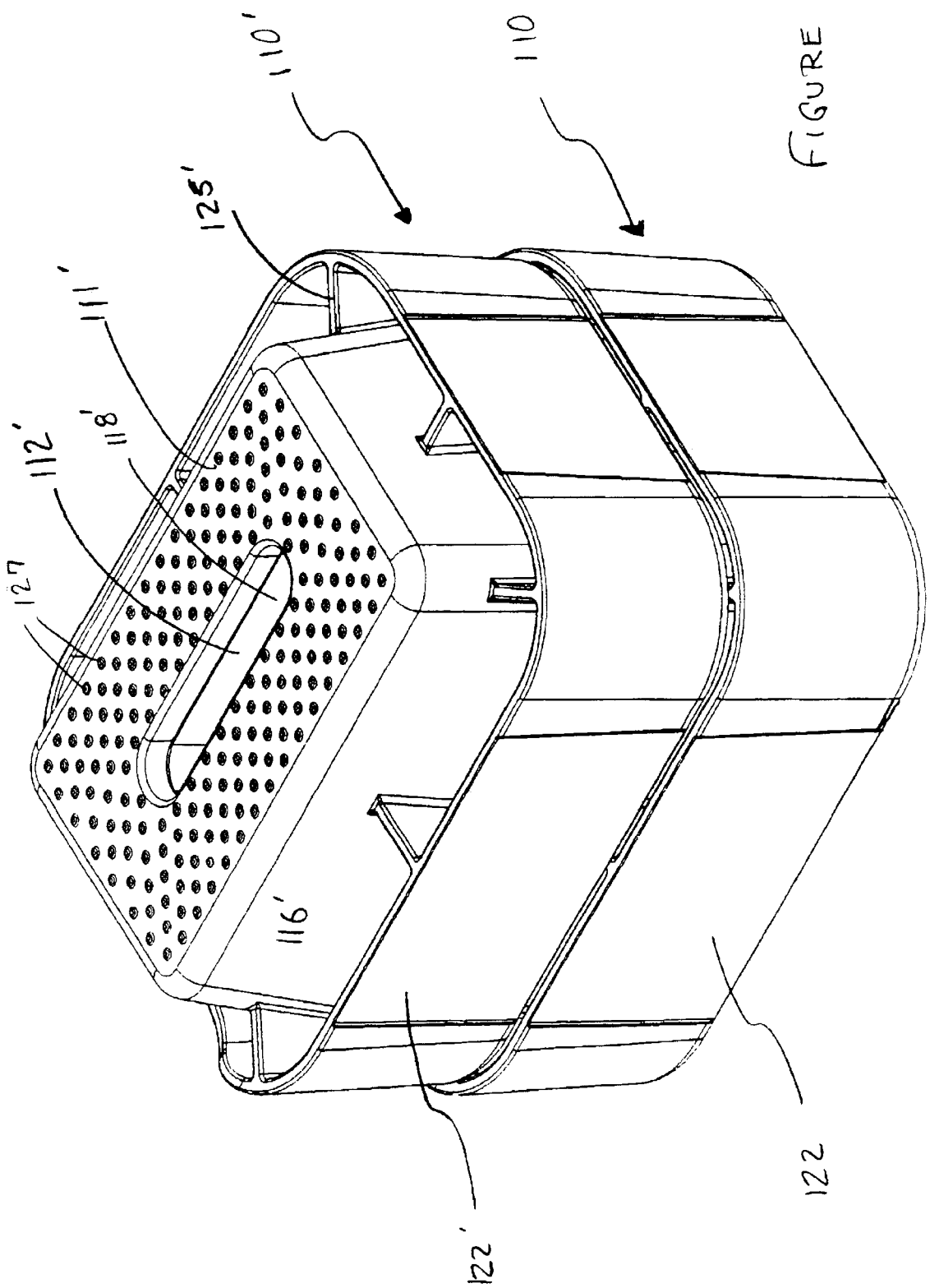
FIG. 7 is a top perspective view of two shipping pods similar to those in FIG. 5, nested together.
Figure 8:
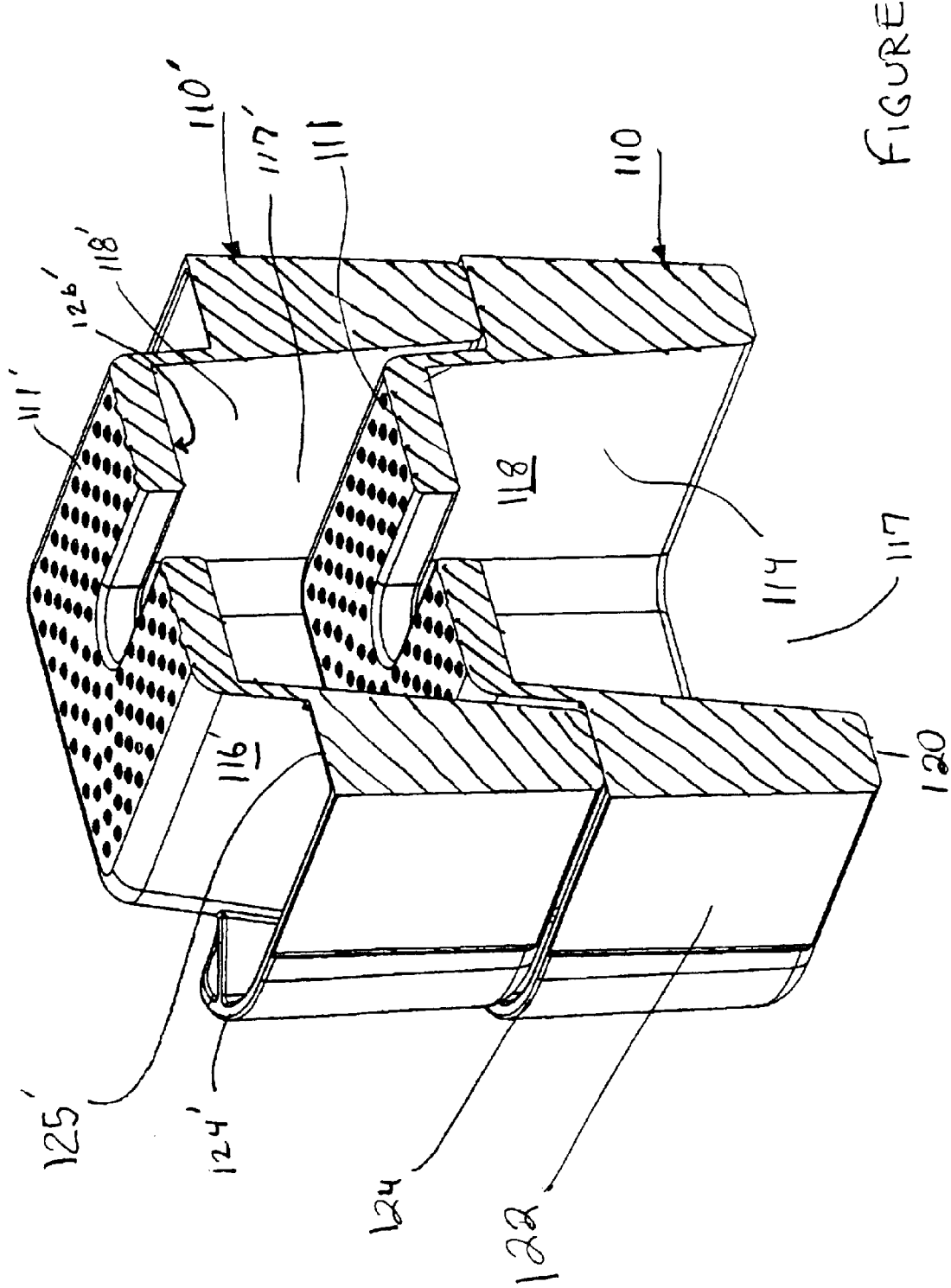
FIG. 8 is a cross-sectional view showing two shipping pods similar to those in FIG. 7 nested together.

Another embodiment of the pod according to the present invention is disclosed in FIGS. 5–8 and is designated as pod 110. The features of FIGS. 5–8, which are similar to the embodiment of FIGS. 1–4 are designated by like reference numbers having a "1" prefix added thereto. As best shown in the cross-sectional views of FIG. 8, the pod according to the present invention includes an inner perimeter wall 114 which extends downwardly and outwardly from top wall 111. Inner perimeter wall 114 has an exterior surface 116 facing away from top wall 111, and an interior surface 118 facing inward (shown in FIGS. 3 and 8). As illustrated in FIG. 8, surface 126' and wall 114' of pod 110' define a tapered area, compartment 117', which receives upper surface 111 of a subjacent pod 110 during a nesting orientation when the pods are not in use, thereby allowing for compact storage.

In keeping with the teachings of the present invention, FIGS. 5–8 illustrate that top wall 111 further includes at least one anti-slip member or anti-rotation member, such as a plurality of protrusions 127 shown in the FIGS. 5–9, disposed across its upper surface in order to enhance contact with the bottom surface of the vending machine 5 in order to prevent rotation or slippage.

FIGS. 7 and 8 illustrates shipping pod 110 in a nested orientation with a similar shipping pod 110', in which similar features between the pods are designated by a like reference number having a prime (') designation. As shown in FIGS. 7 and 8, when shipping pods 110 and 110' are stacked, interior surface 118 of the top shipping pod 110' nests proximate exterior surface 116' of a subjacent shipping pod 110' thereby reducing the required storage space when shipping pods 110 and 110' are not in use.

Referring still to the cross-sectional view of FIG. 8, shipping pod 110 includes a bottom wall 120 or surface connected to inner perimeter wall 114, which said bottom wall 120 extends outwardly from the inner perimeter wall 114 and generally parallel with top wall 111. An outer perimeter wall 122, is connected to bottom wall 120 and includes a top edge 124. Outer wall 122 is relatively shorter than inner perimeter wall 114, and preferably is tapered, extending upwardly and outwardly from bottom wall 120. The transitions between the various walls are shown as fillets. Of course, wall 122 may also extend inwardly or perpendicular from bottom wall 120.

Figure 10:
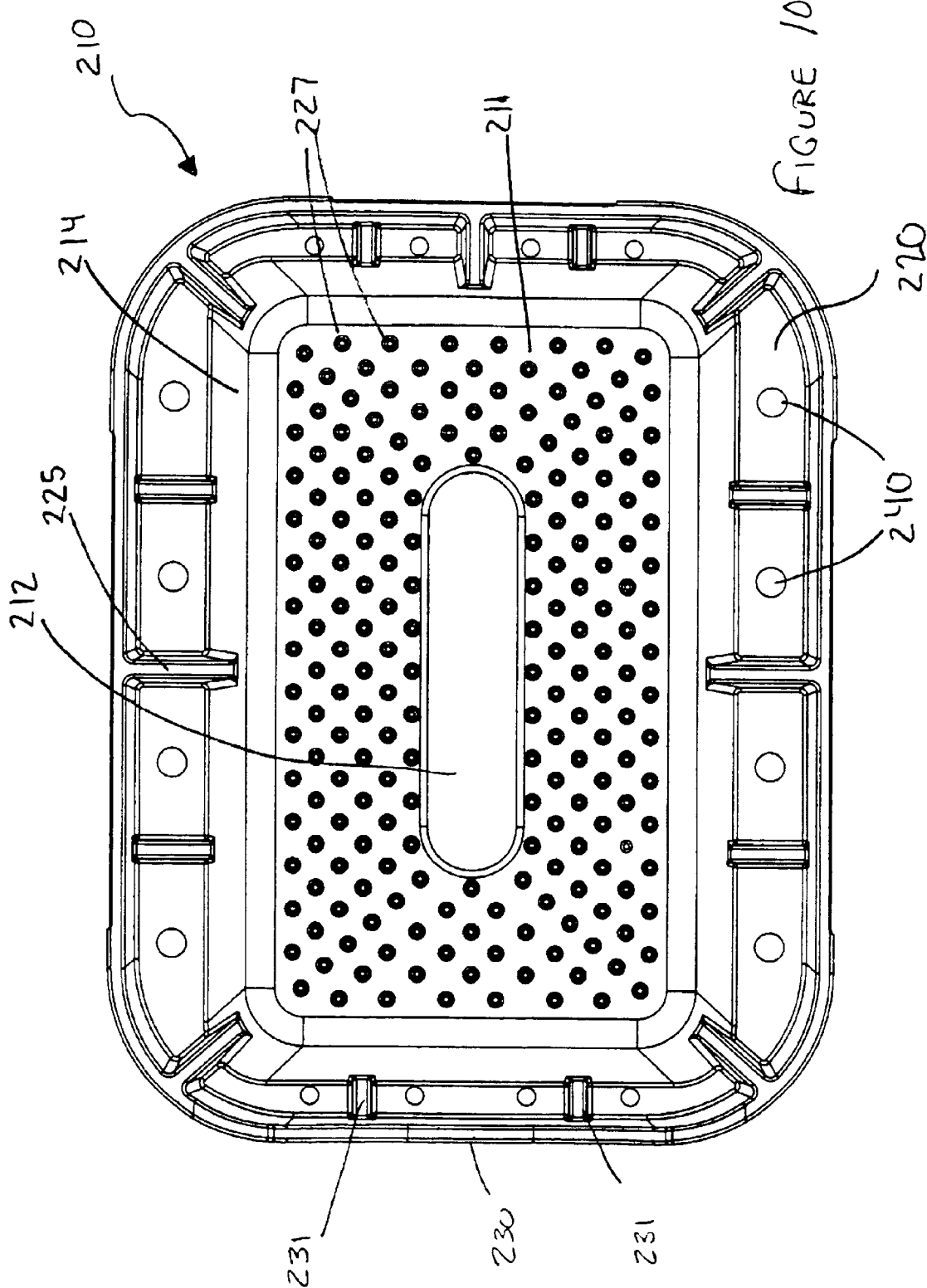
FIG. 10 is a top view of a third embodiment of a shipping pod according to the present invention having protrusions and drainage holes.
Figure 11:
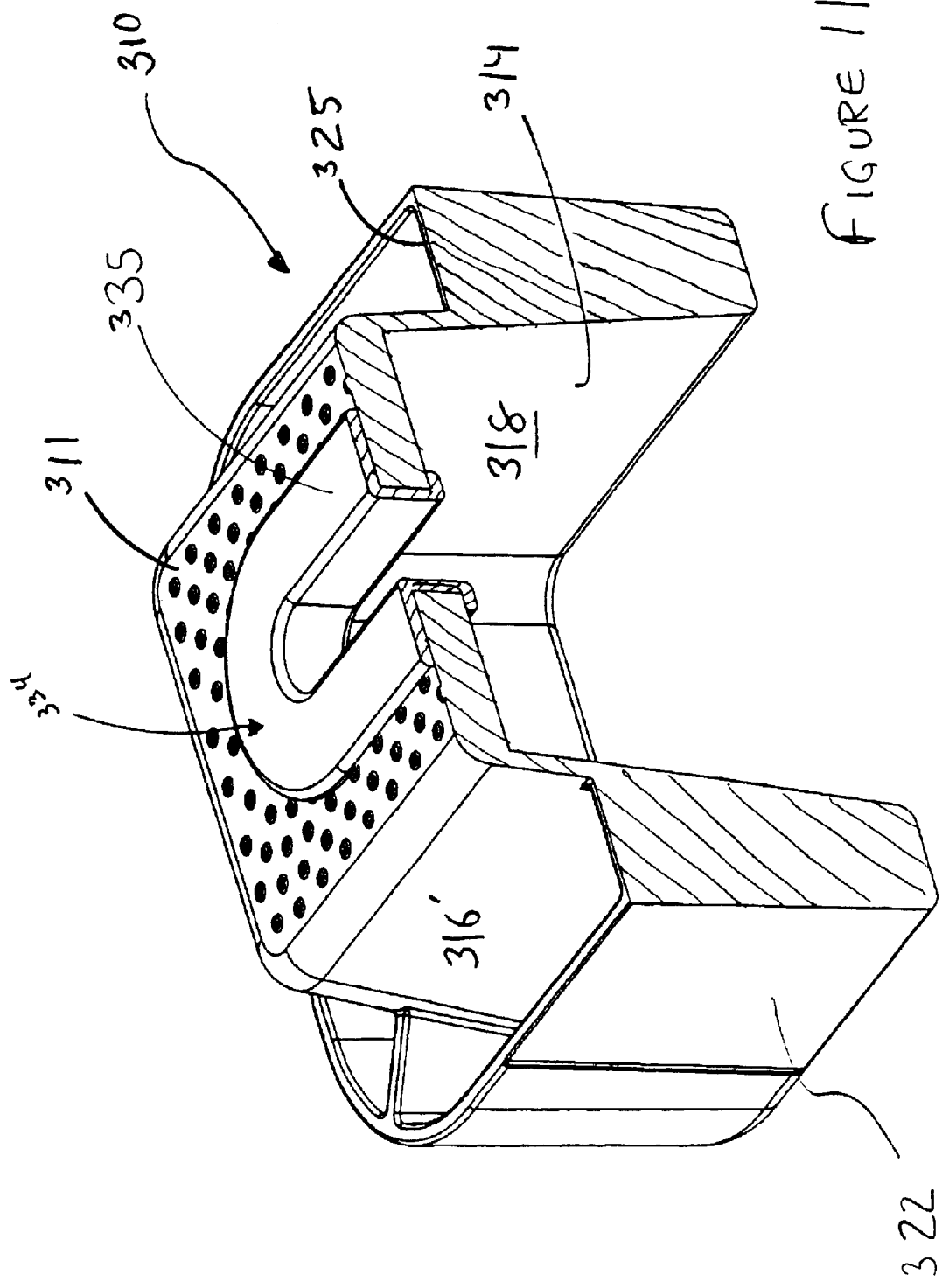
FIG. 11 is a perspective view of a cross-section of a fourth embodiment of the shipping pod according to the present invention, taken across the transverse centerline of the pod, and having a grommet disposed therein.
Figure 12:
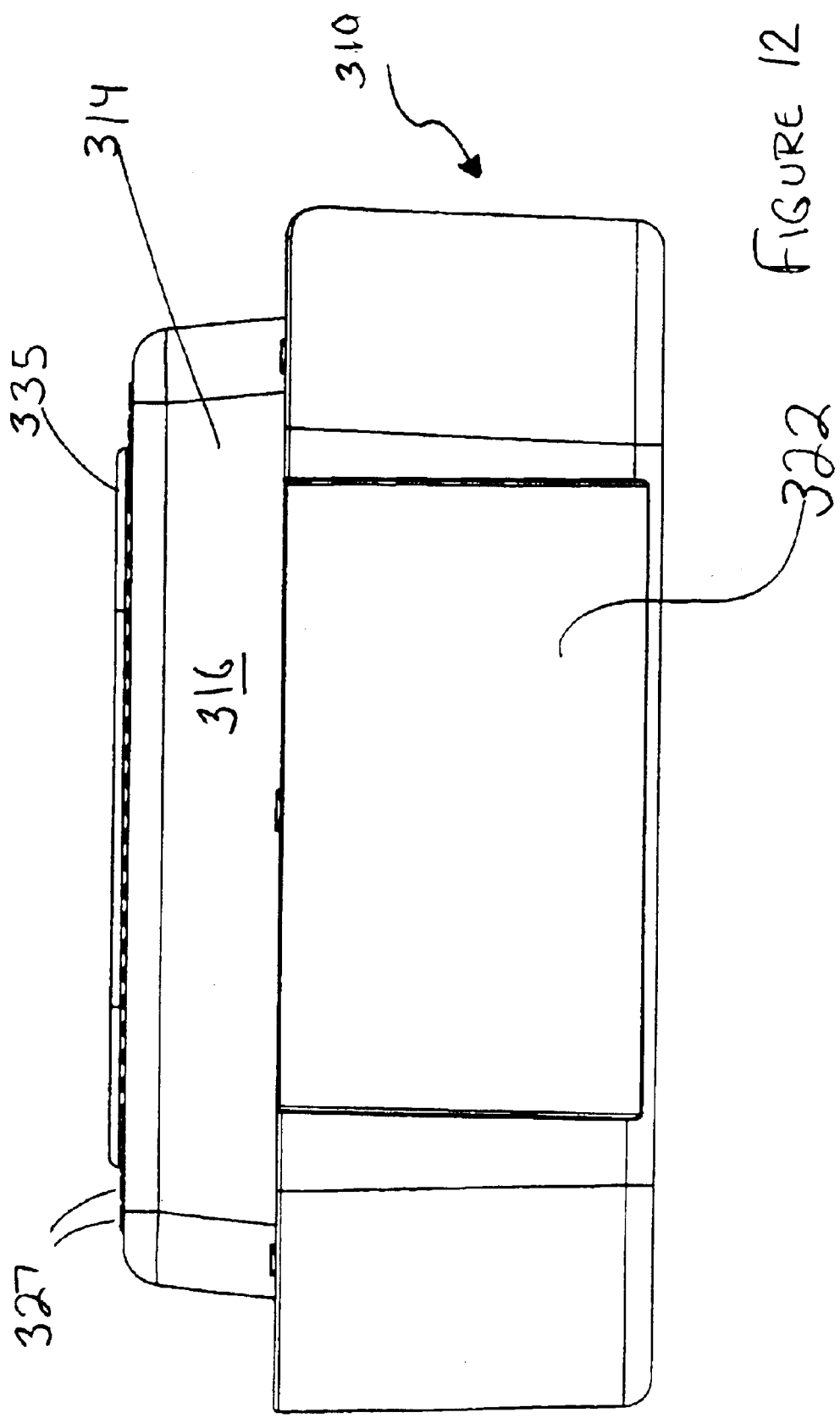
FIG. 12 is a front elevational view of the fourth embodiment of FIG. 11.
Figure 13:
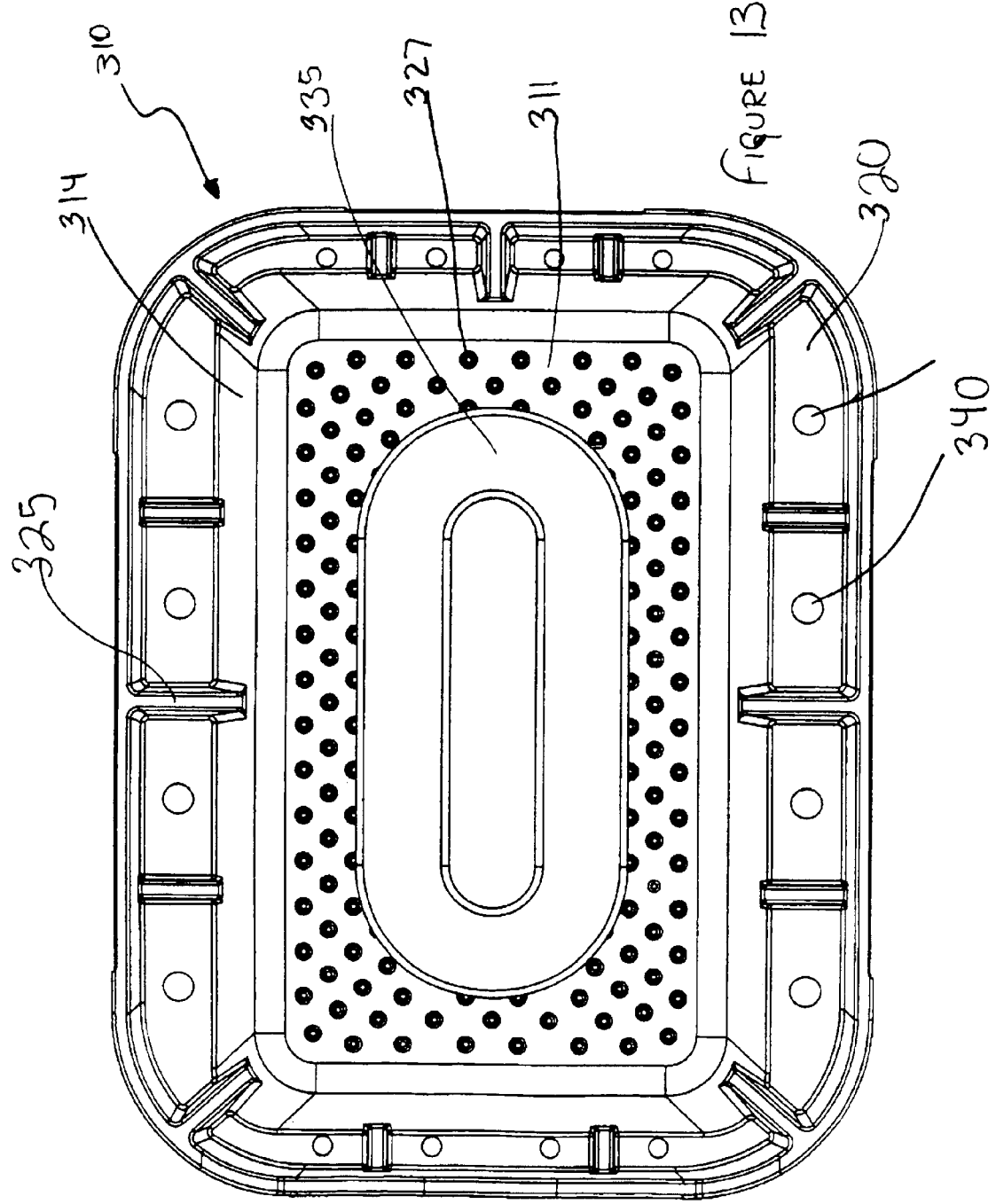
FIG. 13 is a top plan view of the fourth embodiment of FIG. 11.

Referring now to FIG. 10, a third embodiment of the shipping pod is shown therein as pod 210. Pod 210 has features similar to the embodiments shown in FIGS. 1–8 but with a "2" prefix on the reference numbers. A plurality of drainage holes or openings 240 are be included in bottom wall 220 to permit water or other fluid to drain out of the shipping pod, such as during washing or exposure to wet environments. Of course, such openings 240 may also be positioned within the walls or the upper surface 211 of pod 210 for serving the desired purpose. Pod 210 further includes additional gussets 231 in the area adjacent handle portion 230 in order to provide additional strength to the pod 210 in these areas.

Referring now to FIGS. 11, 12, 13 and 14, shown therein is a fourth embodiment of the shipping pod according to the present invention, shown as pod 310, which is similar to the second embodiment illustrated in FIGS. 3 and 4, with similar features having like reference numbers with "3" prefix added thereto. Pod 310 includes another anti-slip member or anti-rotational member 334, illustrated in FIGS. 11–14 as a grommet 335. Top wall 311 includes an elongated grommet 335 which is inserted in and received by opening 312. The upper portion of grommet, 335 is disposed on top surface 311 and extends about opening 312. Grommet 335 is a standard part which is preferably formed from a soft rubber material and acts like a cushion to absorb energy and prevent rotation of the shipping pod when installed on vending machine 5 (see FIG. 9).

The embodiments shown herein illustrate a shipping pod with four inner perimeter walls 14. It is contemplated, however, that the shipping pods may function and be operable according to the present invention by having only two opposing inner perimeter walls 14 (and therefore two opposing bottom walls 20 and two opposing outer perimeter walls 22, where appropriate) without deviating from the scope of this invention.

In operation, vending machine 5 is either tilted or lifted so that the fasteners holding the vending machine leveling feet in place can be removed. Bolt 8 is then inserted through opening 112, as shown in FIG. 9, and threaded into the bore 3 in the bottom of vending machine 5. All four leveling feet are replaced by the shipping pods according to the present invention in this manner. It is further contemplated that shipping pods 10, 110, 210, 310 may be used not only for shipping, but also when the vending machine is operable and in service.

Shipping pods 10, 110, 210, 310 may be rectangular (as illustrated herein), square, round, elliptical, or any other shape as dictated by the specific use. It is noted that the pods disclosed herein are generally symmetrical about their longitudinal centerline. The size of the pod, of course, should correspond proportionally to the size of the object or vending machine 5 on which it is used. As an example for illustrative purposes only, a rectangular shipping pod may have an overall length of 10 inches, a width of 6 inches, and a height of 3.25 inches. Opening 12 may be 4 inches long. A square shipping pod may have a length of 6 inches, a width of 6 inches, and a height of 3.25 inches. The length and width of shipping pod 10 may be such that the shipping pod extends beyond the outer perimeter of vending machine 5 (see FIG. 9) thereby preventing adjacent vending machines from bumping into each other during transportation and causing damage. Further, the 3.25 inch height of the shipping pod is sufficient to allow fork lift tines to get underneath the vending machine to pick it up and transport the vending machine without the need for wheeled racks. However, the vending machine with the shipping pod according to the present invention may also be placed on wheeled racks for transport.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A stackable shipping pod adapted for use on a relatively large object having a bottom surface with at least one attachment member extending therefrom, and further having an outside perimeter, the shipping pod comprising:

a top wall for mating to the bottom surface of the large object, the top wall having at least one elongated opening through which the attachment member is extended for attaching the shipping pod to the large object, the attachment member being movable laterally within the opening to provide selective positioning of the shipping pod relative to the large object among a plurality of positions;

a perimeter wall extending downwardly from the top wall, the perimeter wall having an exterior surface and an interior surface; and an outer perimeter wall spaced outwardly away from the exterior surface of the perimeter wall, the outer perimeter wall having an uppermost portion below a plane at least substantially defined by an upper surface of the top wall, wherein the interior surface of the shipping pod nests proximate to the exterior surface of a second subjacent shipping pod when in a stacked orientation.

2. The shipping pod of claim 1 wherein the top wall includes at least one anti-slip member for contacting the bottom surface of the large object.

3. The shipping pod of claim 2 wherein the at least one ant-slip member includes a grommet disposed in the at least one opening of the top wall.

4. The shipping pod of claim 2, wherein the at least one anti-slip member includes a plurality of protrusions disposed on an upper surface of the top wall.

5. The shipping pod of claim 1 wherein the perimeter wall is sized to extend beyond the outside perimeter of the large object.

6. The shipping pod of claim 1 wherein the top wall includes an undersurface having a plurality of ribs.

7. The shipping pod of claim 1 wherein the shipping pod has a rectangular shape.

8. A stackable shipping pod adapted for use on a relatively large object having a bottom surface with at least one attachment member extending therefrom, and further having an outside perimeter, the shipping pod comprising:

a top wall for mating to the bottom surface of the large object, the top wall having at least one elongated opening through which the attachment member is extended for attaching the shipping pod to the large object, the attachment member being movable laterally within the opening to provide selective positioning of the shipping pod relative to the large object among a plurality of positions;

a perimeter wall extending downwardly from the top wall, the perimeter wall having an exterior surface and an interior surface; and an outer perimeter wall extending upwardly and outwardly from the perimeter wall, wherein the interior surface of the shipping pod pests proximate to the exterior surface of a second subjacent shipping pod when in a stacked orientation.

9. A shipping pod adapted for use on vending machines having a bottom surface with at least one attachment member extending therefrom and an outside perimeter, the shipping pod comprising:

a top wall for mating to the bottom surface of a vending machine, the top wall having an opening for receiving the at least one attachment member therein for attaching the shipping pod to the vending machine;

an inner perimeter wall extending downwardly and outwardly from the top wall; and an outer perimeter wall spaced apart from the inner perimeter wall and attached thereto, the outer perimeter wall and inner perimeter wall defining a pocket therebetween.

10. The shipping pod of claim 9 further comprising a plurality of gussets for attaching the inner perimeter wall and the outer perimeter wall and extending in the pocket therebetween.

11. The shipping pod of claim 9 wherein the top wall includes at least one anti-slip member adapted to contact the bottom surface of the vending machine and prevent rotation of the shipping pod.

12. The shipping pod of claim 11 wherein the at least one anti-slip member includes a grommet received in the opening of the top wall.

13. The shipping pod of claim 11 wherein the at least one anti-slip member includes a plurality of protrusions on an upper surface thereof.

14. The shipping pod of claim 9 further wherein the top wall includes an undersurface having a plurality of ribs for providing strength thereto.

15. The shipping pod of claim 9, further comprising a bottom wall for connecting the inner perimeter wall and outer perimeter wall.

16. A stackable shipping pod for use on a relatively large object having a bottom surface with at least one attachment member extending therefrom, the large object further having an outside perimeter, the shipping pod comprising:

an upper wall member having an upper surface for mating with the bottom surface of the large object, the upper wall member having an opening through which the attachment member is extended; and a sidewall member wall extending downwardly from the periphery of the upper wall member, the sidewall member and upper wall member defining a compartment therebetween, the sidewall member comprising an inner wall having an outer surface and an outer wall spaced apart from the outer surface of the inner wall, wherein in a stacked orientation, the compartment of the shipping pod receives therein the upper wall member of a second shipping pod.

17. The shipping pod of claim 16 wherein the upper wall member includes at least one anti-slip member adapted to contact the bottom surface of the large object and prevent rotation of the shipping pod.

18. A stackable shipping pod adapted for use on a relatively large object having a bottom surface with at least one attachment member extending therefrom, and further having an outside perimeter, the shipping pod comprising:

a top wall for mating to the bottom surface of the large object, the top wall having at least one opening through which the attachment member is extended for attaching the shipping pod to the large object;

a perimeter wall extending downwardly and outwardly from the top wall, the perimeter wall having an exterior surface and an interior surface; and an outer perimeter wall extending upwardly and outwardly from the perimeter wall, wherein the interior surface of the shipping pod nests proximate to the exterior surface of a second subjacent shipping pod when in a stacked orientation.

19. The shipping pod of claim 18 wherein the outer perimeter wall extends beyond the outside perimeter of the relatively large object.

20. The shipping pod of claim 18 wherein the outer perimeter wall includes a handle portion for handling the shipping pod.

21. The shipping pod of claim 18 further comprising a bottom wall connecting the perimeter wall and the outer perimeter wall.

22. The shipping pod of claim 18, wherein the at least one opening of the top wall has an elongated shape within which the attachment member is movable laterally for providing selective positioning of the shipping pod relative to the large object.

23. The shipping pod of claim 9, wherein the opening of the top wall has an elongated shape in which the at least one attachment member is movable for providing selective lateral positioning of the shipping pod relative to the vending machine.

24. The shipping pod of claim 16, wherein the opening of the upper wall member has an elongated shape in which the at least one attachment member is moveable for providing selective lateral positioning of the shipping pod relative to the large object.

25. The shipping pod of claim 1, wherein the perimeter wall also extends outwardly from the top wall.

26. A stackable shipping pod adapted for use on a relatively large object having a bottom surface with an attachment member extending therefrom, and further having an outside perimeter, the shipping pod comprising:

a top wall for mating to the bottom surface of the large object, the top wall having at least one opening through which the attachment member is extended for attaching the shipping pod to the large object;

a perimeter wall extending downwardly from the top wall, the perimeter wall having an exterior surface and an interior surface;

an outer perimeter wall spaced outwardly away from the exterior surface of the perimeter wall, the outer perimeter wall having an uppermost portion below a plane at least substantially defined by an upper surface of the top wall; and wherein an interior surface of the shipping pod nests proximate to an exterior surface of a second subjacent shipping pod when in a stacked orientation.

27. The stackable shipping pod according to claim 26 further including a wall connecting the perimeter wall to the outer perimeter wall.

28. The shipping pod of claim 26 wherein the top wall, perimeter wall and outer perimeter wall are an integrally molded, plastic, unitary construction.

29. The shipping pod of claim 26 further including a plurality of gussets connecting the exterior surface of the perimeter wall to an interior surface of the outer perimeter wall.

30. The shipping pod of claim 26 further including a plurality of ribs extending radially from the perimeter wall.

31. The shipping pod of claim 30 wherein the plurality of ribs extend radially outwardly from the exterior surface of the perimeter wall.

32. The shipping pod of claim 1 wherein the perimeter wall is substantially rigid when under load and substantially rigid when not under load.

33. The shipping pod of claim 1 wherein the opening is completely surrounded by the top wall.

34. The shipping pod of claim 1 further including a bottom wall extending outwardly from a lower periphery of the perimeter wall.

35. The shipping pod of claim 34 wherein the bottom wall is at least substantially parallel to the top wall.

36. The shipping pod of claim 34 further including a plurality of ribs extending outwardly from the exterior surface of the perimeter wall and connecting to the bottom wall.

37. A shipping pod adapted for use on a relatively large object having a bottom surface with an attachment member extending therefrom and further having an outside perimeter, the shipping pod comprising:
 a top wall for mating to the bottom surface of the large object, the top wall having at least one opening through which the attachment member is extended for attaching the shipping pod to the large object, the attachment member being insertable in any of a plurality of positions through the at least one opening to provide selective positioning of the shipping pod relative to the large object;
 a perimeter wall extending downwardly from the top wall, the perimeter wall having an exterior surface and an interior surface; and
 an outer perimeter wall spaced outwardly away from the exterior surface of the perimeter wall.

38. The shipping pod of claim 37 further including a plurality of ribs extending outwardly from the exterior surface of the perimeter wall to an interior surface of the outer perimeter wall.

39. The shipping pod of claim 37 wherein the outer perimeter wall has an uppermost portion below a plane at least substantially defined by an upper surface of the top wall.

40. A stackable shipping pod adapted for use on a relatively large object having a bottom surface with an attachment member extending therefrom, and further having an outside perimeter, the shipping pod comprising:
 a top wall for mating to the bottom surface of the large object, the top wall having at least one opening through which the attachment member is extended for attaching the shipping pod to the large object;
 a perimeter wall extending downwardly from the top wall, the perimeter wall having an exterior surface and an interior surface;
 an outer perimeter wall spaced outwardly away from the exterior surface of the perimeter wall;
 a plurality of ribs connecting the exterior surface of the perimeter wall to an interior surface of the outer perimeter wall; and
 wherein an interior surface of the shipping pod nests proximate to an exterior surface of a second subjacent shipping pod when in a stacked orientation.

41. The shipping pod of claim 37 wherein an interior surface of the shipping pod nests proximate to an exterior surface of a second subjacent shipping pod when in a stacked orientation.

42. A shipping pod adapted for use on a relatively large object having a bottom surface with at least one attachment member extending therefrom, and further having an outside perimeter, the shipping pod comprising:
 a top wall for mating to the bottom surface of the large object, the top wall having at least one opening through which the attachment member is extended for attaching the shipping pod to the large object, the attachment member being insertable in any of a plurality of positions through the at least one opening to provide selective positioning of the shipping pod relative to the large object;
 a perimeter wall extending downwardly from the top wall, the perimeter wall having an exterior surface and an interior surface; and
 an outer perimeter wall spaced outwardly away from the exterior surface of the perimeter wall, the outer perimeter wall having an uppermost portion below a plane at least substantially defined by an uppermost portion of the perimeter wall.

43. The shipping pod of claim 42 further including a transition wall connecting the perimeter wall to the outer perimeter wall.

44. The shipping pod of claim 43 wherein the transition wall is generally parallel to the top wall.

45. The shipping pod of claim 42 further including a plurality of ribs connecting the exterior surface of the perimeter wall to an interior surface of the outer perimeter wall.

46. A shipping pod adapted for use on a relatively large object having a bottom surface with at least one attachment member extending therefrom, and further having an outside perimeter, the shipping pod comprising:
 a top wall for contacting the bottom surface of the large object, the top wall having at least one opening through which the attachment member can be extended for attaching the shipping pod to the large object;
 a perimeter wall extending downwardly from the top wall, the perimeter wall having an exterior surface and an interior surface; and
 an outer perimeter wall extending outwardly from the exterior surface of the perimeter wall and then substantially vertically, the outer perimeter wall spaced away from the exterior surface of the wall.

47. The shipping pod of claim 46 wherein the outer perimeter wall includes at least one cutout portion.

48. The shipping pod of claim 47 wherein the at least one cutout portion reduces a height of the outer perimeter wall at the cutout portion to facilitate handling of the shipping pod.

49. The shipping pod of claim 48 further including a transition wall connecting the perimeter wall to the outer perimeter wall.

50. The shipping pod of claim 49 wherein the cutout portion is formed in an upper edge of the outer perimeter wall to reduce the height of the upper edge of the outer perimeter wall at the at least one cutout portion.

* * * * *

UNITED STATES PATENT AND TRADEMARK OFFICE
CERTIFICATE OF CORRECTION

PATENT NO.        : 6,811,125 B1  
APPLICATION NO.   : 09/688780  
DATED             : November 2, 2004  
INVENTOR(S)       : Koefelda et al.

Page 1 of 1

It is certified that error appears in the above-identified patent and that said Letters Patent is hereby corrected as shown below:

Column 6, Line 63, please delete "ant-slip" and insert --anti-slip--.

Column 7, Line 24, please delete "pests" and insert --nests--.

Column 8, Line 1, please delete "the" and insert --a--.

Signed and Sealed this

Seventh Day of October, 2008

JON W. DUDAS  
*Director of the United States Patent and Trademark Office*